(12) United States Patent
Ferguson et al.

(10) Patent No.: US 10,963,688 B2
(45) Date of Patent: Mar. 30, 2021

(54) SYSTEMS AND METHODS FOR A CUSTOMER FEEDBACK CLASSIFICATION SYSTEM

(71) Applicant: Walmart Apollo, LLC, Bentonville, AR (US)

(72) Inventors: David Ferguson, Bentonville, AR (US); Saba Beyene, Fayetteville, AR (US); Jay Howell, Bentonville, AR (US); John Purma, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 115 days.

(21) Appl. No.: 16/214,938

(22) Filed: Dec. 10, 2018

(65) Prior Publication Data

US 2019/0180095 A1    Jun. 13, 2019

Related U.S. Application Data

(60) Provisional application No. 62/596,878, filed on Dec. 10, 2017.

(51) Int. Cl.
| | |
|---|---|
| *G06Q 30/02* | (2012.01) |
| *G06F 40/30* | (2020.01) |
| *G06F 40/205* | (2020.01) |
| *G06K 9/00* | (2006.01) |

(52) U.S. Cl.
CPC ....... *G06K 9/00456* (2013.01); *G06F 40/205* (2020.01); *G06F 40/30* (2020.01); *G06Q 30/0282* (2013.01)

(58) Field of Classification Search
None
See application file for complete search history.

(56) References Cited

U.S. PATENT DOCUMENTS

| | | | |
|---|---|---|---|
| 2006/0218179 A1 | 9/2006 | Gardner et al. | |
| 2007/0198249 A1* | 8/2007 | Adachi | G06F 40/205 704/9 |
| 2010/0114899 A1 | 5/2010 | Guha et al. | |
| 2011/0106721 A1* | 5/2011 | Nickerson | G06Q 30/02 705/347 |
| 2012/0131021 A1* | 5/2012 | Blair-Goldensohn | G06F 16/345 707/750 |

(Continued)

OTHER PUBLICATIONS

International Search Report and Written Opinion from related International Patent Application No. PCT/US/2018/064731 dated Feb. 15, 2019.

*Primary Examiner* — Idowu O Osifade
(74) *Attorney, Agent, or Firm* — Fitch, Even, Tabin & Flannery LLP

(57) ABSTRACT

Systems, methods, and machine readable media are provided for classifying customer feedback. In exemplary embodiments, text is captured from at least one source relating to at least one product. The text is scanned and a score is produced for sentiment for the at least one product. The text is filtered into parts of speech and key words to produce filtered text. The filtered text is transformed into a term-document matrix. A risk score is calculated and prioritized based on the term-document matrix and the sentiment score. The product and the associated risk score are reported to a subject matter expert (SME), where a determination is made whether the product is reportable or non-reportable.

18 Claims, 7 Drawing Sheets

(56) References Cited

U.S. PATENT DOCUMENTS

| | | | |
|---|---|---|---|
| 2012/0316916 A1 | 12/2012 | Andrews et al. | |
| 2013/0018894 A1* | 1/2013 | Qiao | G06F 16/345 |
| | | | 707/748 |
| 2015/0032658 A1* | 1/2015 | Pantaliano | G06Q 30/0282 |
| | | | 705/347 |
| 2015/0161686 A1* | 6/2015 | Williams | G06Q 30/0282 |
| | | | 705/347 |
| 2017/0220578 A1* | 8/2017 | Kazi | G06F 40/30 |
| 2017/0286431 A1 | 10/2017 | Lijachev et al. | |
| 2019/0245973 A1* | 8/2019 | Dwyer | G10L 25/72 |

* cited by examiner

SYSTEMS AND METHODS FOR A CUSTOMER FEEDBACK CLASSIFICATION SYSTEM

CROSS-REFERENCE TO RELATED PATENT APPLICATIONS

This application claims priority to U.S. Provisional Application No. 62/596,878 filed on Dec. 10, 2017, the content of which is hereby incorporated by reference in its entirety.

BACKGROUND

Customer feedback is a useful tool for analyzing how well a product has been received and valued by a customer. Feedback may be submitted by a customer through a variety of means including websites, phone calls and social media. The customer feedback can be used to determine if a product needs to be recalled.

SUMMARY

In one embodiment, a system for customer feedback classification is provided. The system is configured to execute a capture module, a scoring module, a filtering module, a transformation module, a risk module and a categorization module. The capture module when executed captures text from at least one source relating to at least one product. The scoring module when executed scans the text and produces a score for sentiment for the at least one product. The filtering module when executed filters the text into parts of speech and key words to produce filtered text. The transformation module when executed transforms the filtered text into a term-document matrix. The risk module when executed calculates and prioritizes a risk score based on the term-document matrix and the sentiment. The categorization module when executed reports the product and the associated risk score to a subject matter exert (SME).

In another embodiment, a computer-implemented method for customer feedback classification is provided. The method includes capturing text from at least one source relating to at least one product, scanning the text and producing a score for sentiment for the at least one product. The method further includes filtering the text into parts of speech and key words to produce filtered text and transforming the filtered text into a term-document matrix. The method also includes calculating and prioritizing a risk score based on the term-document matrix and the sentiment and reporting the product and the associated risk score to a subject matter exert (SME).

In another embodiment, a non-transitory machine-readable medium is provided that stores instructions executable by a processing device. Execution of the instructions causes the processing device to implement a method for performing customer feedback classification. The method includes capturing text from at least one source relating to at least one product, scanning the text and producing a score for sentiment for the at least one product. The method further includes filtering the text into parts of speech and key words to produce filtered text and transforming the filtered text into a term-document matrix. The method also includes calculating and prioritizing a risk score based on the term-document matrix and the sentiment and reporting the product and the associated risk score to a subject matter exert (SME).

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein. In the drawings.

DETAILED DESCRIPTION

Exemplary embodiments provide a customer feedback classification system for one or more products. The customer feedback classification system is useful in determining if the product needs to be recalled and in signaling other problems with products. Customer feedback can occur in many ways, including but not limited to, websites, hotline calls and the like. The amount of customer feedback can be an extremely large amount of data, and it can be difficult if not impossible to read each and every piece of customer feedback. A machine learning algorithm is used to read all the feedback and make a determination as to whether the feedback should be reported to an agency such as the Consumer Product Safety Commission (CPSC). The customer feedback can also be used to determine trends such as potential hazards, recalls, business decisions, potential injury and reliability.

Figure 1:
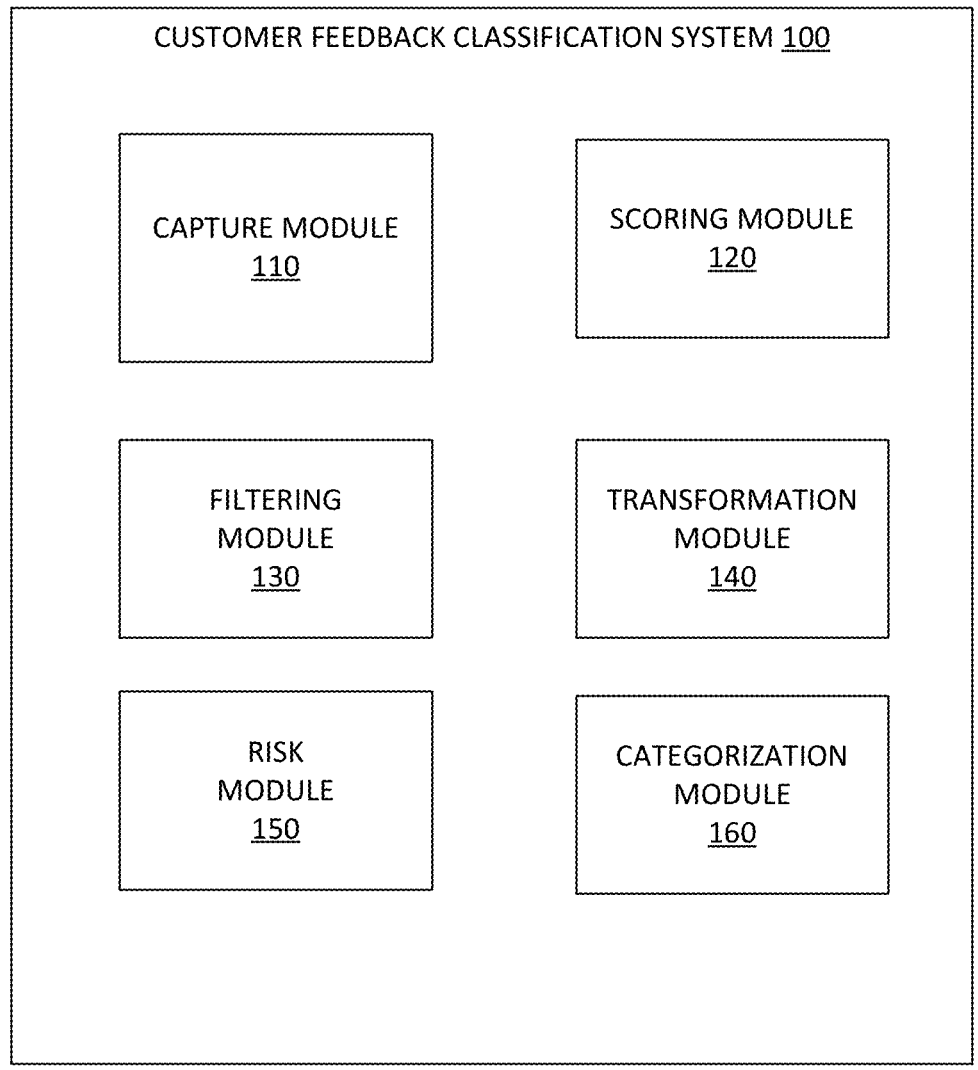
FIG. 1 is a block diagram showing a customer feedback classification system in terms of modules, according to an example embodiment.

FIG. 1 is a block diagram showing a customer feedback classification system 100 in terms of modules according to an example embodiment. One or more of the modules may be implemented using server 630 shown in FIG. 6, while other modules may be implemented using client devices 610, 620 shown in FIG. 6. The modules include a capture module 110, a scoring module 120, a filtering module 130, a transformation module 140, a risk module 150 and a categorization module 160. The modules may include various circuits, circuitry and one or more software components, programs, applications, or other units of code base or instructions configured to be executed by one or more processors. Although modules 110, 120, 130, 140, 150 and 160 are shown as distinct modules in FIG. 1, it should be understood that modules 110, 120, 130,140, 150 and 160 may be implemented as fewer or more modules than illustrated. It should be understood that modules 110, 120, 130, 140 and 160 may communicate with one or more components included in system 600 (FIG. 6), such as client devices 610, 620, server 630, and database(s) 640. One or more components and functionalities of the customer feedback classification system 100 may be provided as an application (e.g., mobile application) that the individual can download or install on the client device 610, 620.

The capture module 110 may be a hardware or software-implemented module configured to capture text from at least one source relating to at least one product. The source may include hotline calls and online reviews about the product. Generally, text from online reviews can be captured while audio calls may be converted to text, and then captured.

The scoring module 120 may be a hardware or software-implemented module configured to scan the text and produce a score for sentiment for the at least one product. The scoring module may also produce a score for subjectivity for the at least one product. The scoring module uses a text sentiment algorithm to produce the score for sentiment for the at least one product.

The filtering module 130 may be a hardware or software-implemented module configured to filter the text into parts of speech and key words to produce filtered text. The filtering module uses regular expressions and stop words to remove special characters, common words, and common phrases.

The transformation module 140 may be a hardware or software-implemented module configured to transform the filtered text into a term-document matrix. The transformation module counts each word by document and divides that amount by a total number of words in the document for determining a final score.

The risk module 150 may be a hardware or software-implemented module configured to calculate and prioritize a risk score based on the term-document matrix and the sentiment. The risk module calculates and prioritizes the risk score based on a probability that the associated product is reportable.

The categorization module 160 may be a hardware or software-implemented module configured to report the product and the associated risk score to a subject matter expert (SME).

The SME determines if the product is reportable or non-reportable. Changes to a product from reportable to non-reportable or from non-reportable to reportable are fed back into the text sentiment algorithm.

Figure 2:
FIG. 2 is a screenshot illustrating customer feedback, according to an example embodiment.

FIG. 2 is an example screenshot 200 showing a customer review for a certain product in an exemplary embodiment. The screen shot includes an Aspects and Features section 202 which shows a cumulative grading of different characteristics customers have associated with the product, along with an associated rating. In this example the characteristics include service, price, general, performance, aesthetics, variety, design, satisfaction, delivery, size, product and quality. Each characteristic is graded on a scale of zero to five. In this example, the grading varies from a low grade of 3.3 for service, variety and delivery, to a high score of 4 for satisfaction. It will be appreciated that other grading scales are also within the scope of the present invention.

Also shown is a review 204 from a customer regarding the product. In this instance, the review is negative. This text of this review is captured by the capture module of the classifying customer feedback system. The scoring module scans the captured text and produces a score for sentiment for the product. Here the product is perceived in a negative light, so the sentiment score reflects this negative perception of the product. The filtering module filters the text into parts of speech and key words to produce filtered text. In this example the filtered text may contain a collection of negative terms in the review for the product. These terms may include such terms as "no crystal clear sound", "unable to hear me", "didn't hold a charge", "completely lost charge" and "no plans on purchasing another". The transformation module transforms the filtered text into a term-document matrix, after which the risk module calculates a risk score based on the term-document matrix and the sentiment. The categorization module reports the product and the associated risk for the product to a subject matter expert.

Figure 3:
FIG. 3 is a screenshot showing testing and inspection performance and return reasons for a product, according to an example embodiment.

FIG. 3 is a screenshot of a page 300 showing a Testing and Inspection Performance section 302 and a Return Reasons section 304 in an exemplary embodiment. Section 302 shows a total failure rate of 7.28% which includes a quality fail rate of 6.25 and a product safety and compliance failure rate of 1.08%. The Testing and Inspection performance section 302 shows three circular graphs 306, 308 and 310. Section 304 shows a series of stacked bar graphs. Each of the bar graphs includes a section 312 showing what percentage of customers returned the product because they changed their mind, a section 314 showing what percentage of customers returned the product because the product was damaged, a section 316 showing what percentage of customers returned the product because the product did not meet their expectations, a section 318 showing what percentage of customers returned the product because the product did not work, a section 320 showing what percentage of customers returned the product because the product was incorrect or was missing an item, and a section 322 showing what percentage of customers returned the product because the product was of poor quality.

Figure 4:
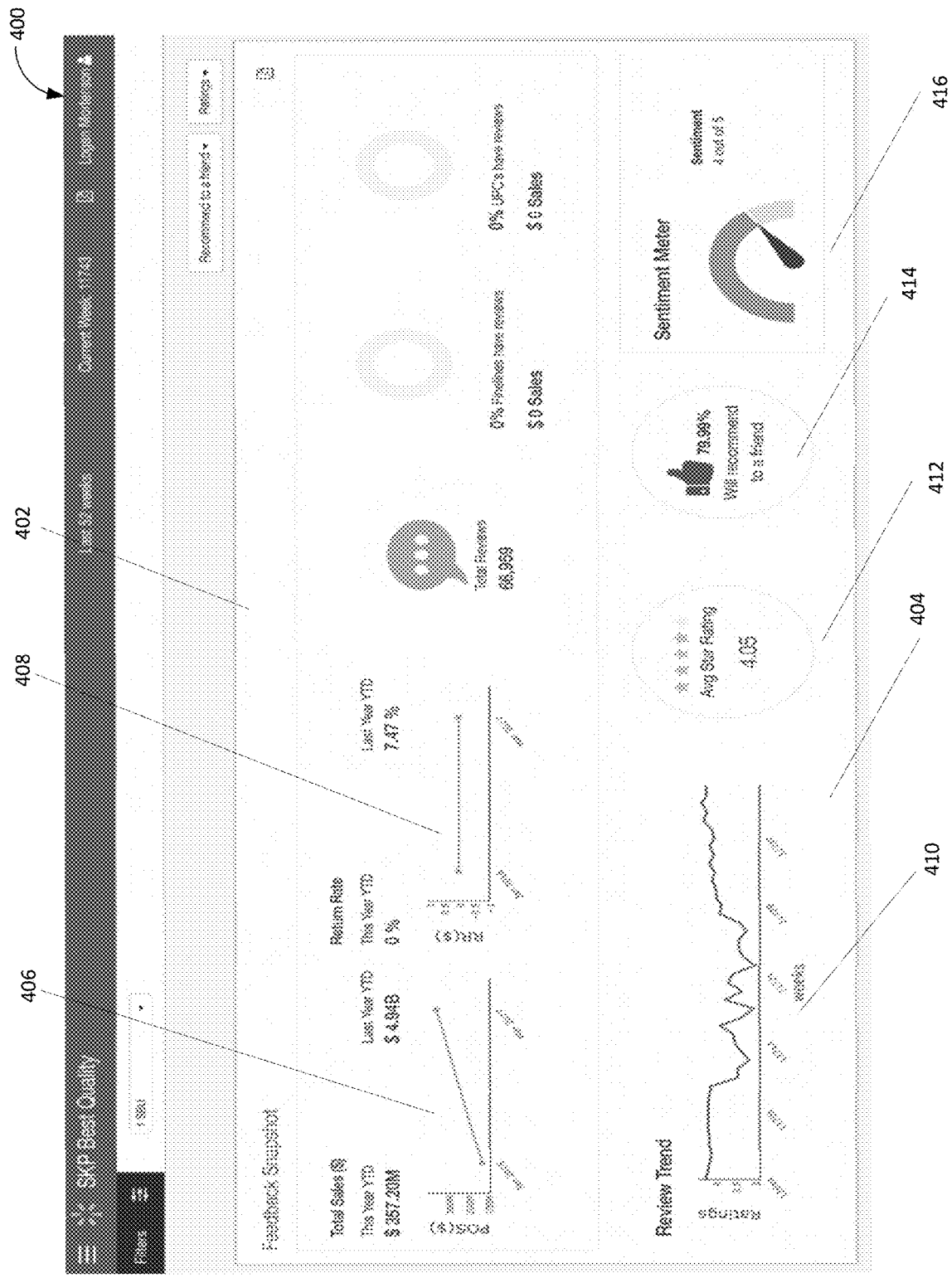
FIG. 4 is a screenshot showing a feedback snapshot for a product, according to an example embodiment.

FIG. 4 is a screenshot 400 showing a Feedback Snapshot section 402 and a Review Trend section 404 in an exemplary embodiment. Section 402 shows a graph 406 representing the total sales for the product for the current year to date ($357.20M) and also for last years total sales for the year to date ($4.94B). Also shown in this section is a graph 408 showing the return rate for the year to date (0%) as well as last years return rate year to date (7.47%). This information highlights possible problems with a product. Section 404 shows a graph 410 representing the Review Trend over a period of weeks. Also shown is an average star rating 412, in this example a score of 4.05. A recommendation icon 414 is also shown with a value of 79.99% would recommend this product to as friend. A Sentiment Meter 416 is shown as a semicircular indicator and needle, in this example the sentiment value for this product is a 4 out of a possible 5. These values can be used to aid in determining the risk score for the product.

Figure 5:
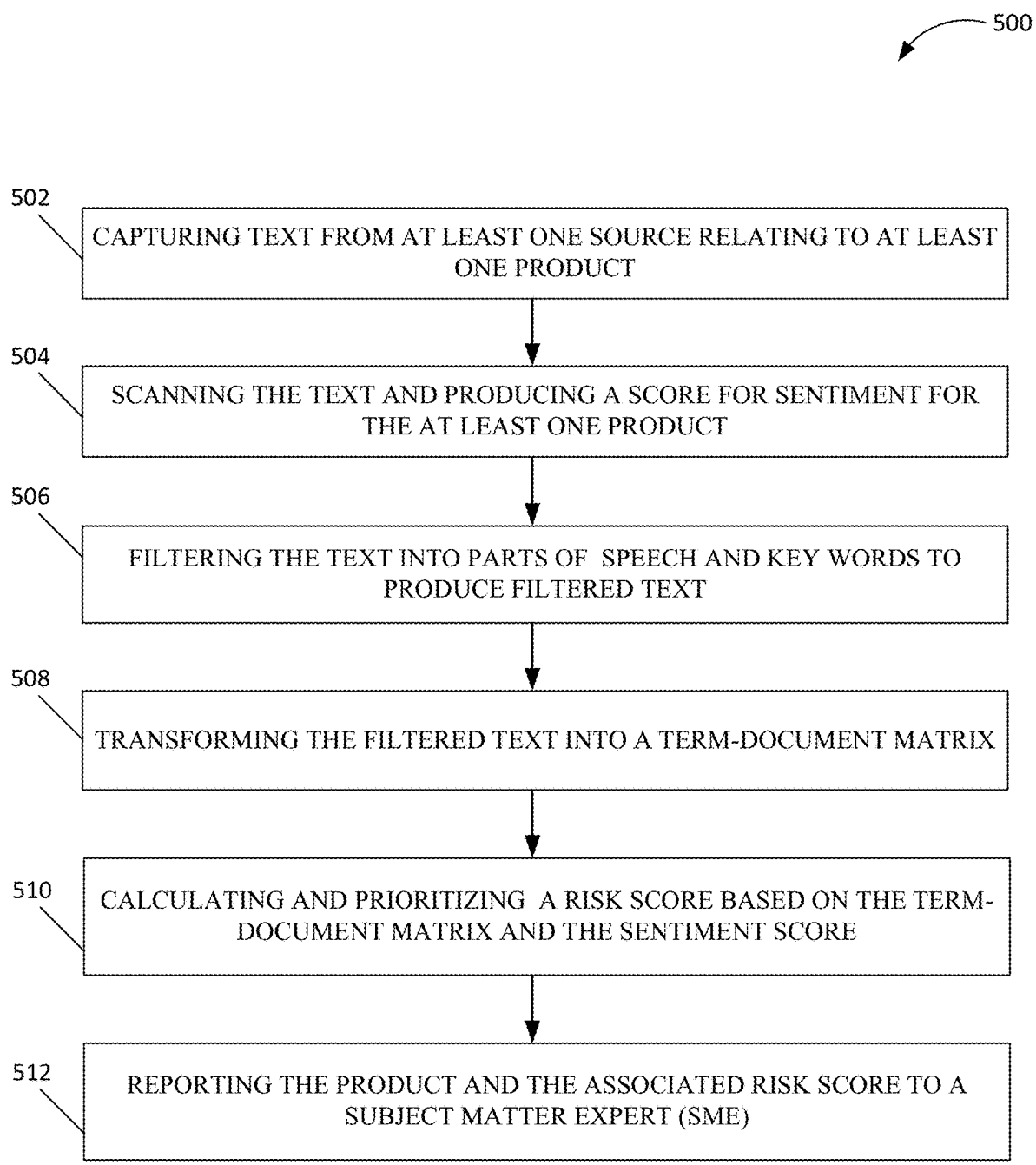
FIG. 5 is a flowchart illustrating an exemplary method for performing customer feedback classification, according to an example embodiment.

FIG. 5 is a flow diagram showing illustrative processing that can be implemented within a system for classifying customer feedback in an exemplary embodiment. Rectangular elements are herein denoted "processing blocks" and represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

FIG. 5 is a flowchart illustrating an exemplary method 500 for classifying customer feedback, according to an example embodiment. The method 500 may be performed using one or more modules of system 100 described above.

At processing block 502, the capture module 120 captures text from at least one source relating to at least one product. The source may include hotline calls, social media, and online reviews about the product. In certain embodiments the text may be the result from converting an audio file (for example, from a phone call) to a text file.

At processing block 504, the scoring module scans the text and produces a score for sentiment for at least one product. The sentiment score correlates to how positive the review of the product was. In certain embodiments, the scoring module may further produce a score relating to the subjectivity of the product. The subjectivity score correlates to the consumer's opinion of the product. This scanning and scoring may be performed using a text sentiment algorithm such as TextBlob in Python.

At processing block 506, the filtering module filters the text into parts of speech and key words to produce filtered text. The filtering module uses regular expressions and stop words to remove special characters, common words and common phrases. This filtering may be performed using a Python script.

At processing block 508, the filtered text is transformed into a term-document matrix. The term-document matrix counts each word by document and divides that by the total words in the document to obtain a score between zero and one.

At processing block 510, the risk module calculates and prioritizes a risk score based on the term-document matrix and the sentiment score. The term-document matrix and the sentiment score are fed through an algorithm. The risk scores are calculated and prioritized based on the chance or probability that the specific product is reportable to Product Safety or Consumer Protection. The algorithm used for performing this step may be a neural network, a logistic regression or a tree-based model. It will be appreciated that in other embodiments, the risk scores may be calculated and prioritized based on the chance or probability of other types of events or issues occurring that are not related to CSPC reporting.

At processing block 512, a categorization model reports the product and the associated risk score to a subject matter expert (SME). The list of products with the risk scores of being reportable are fed into a User Interface and categorized to the correct SME for further review. The SME has the ability to change a product from reportable to non-reportable or vice versa. These changes are fed back into the algorithm for constant learning and re-training.

Figure 6:
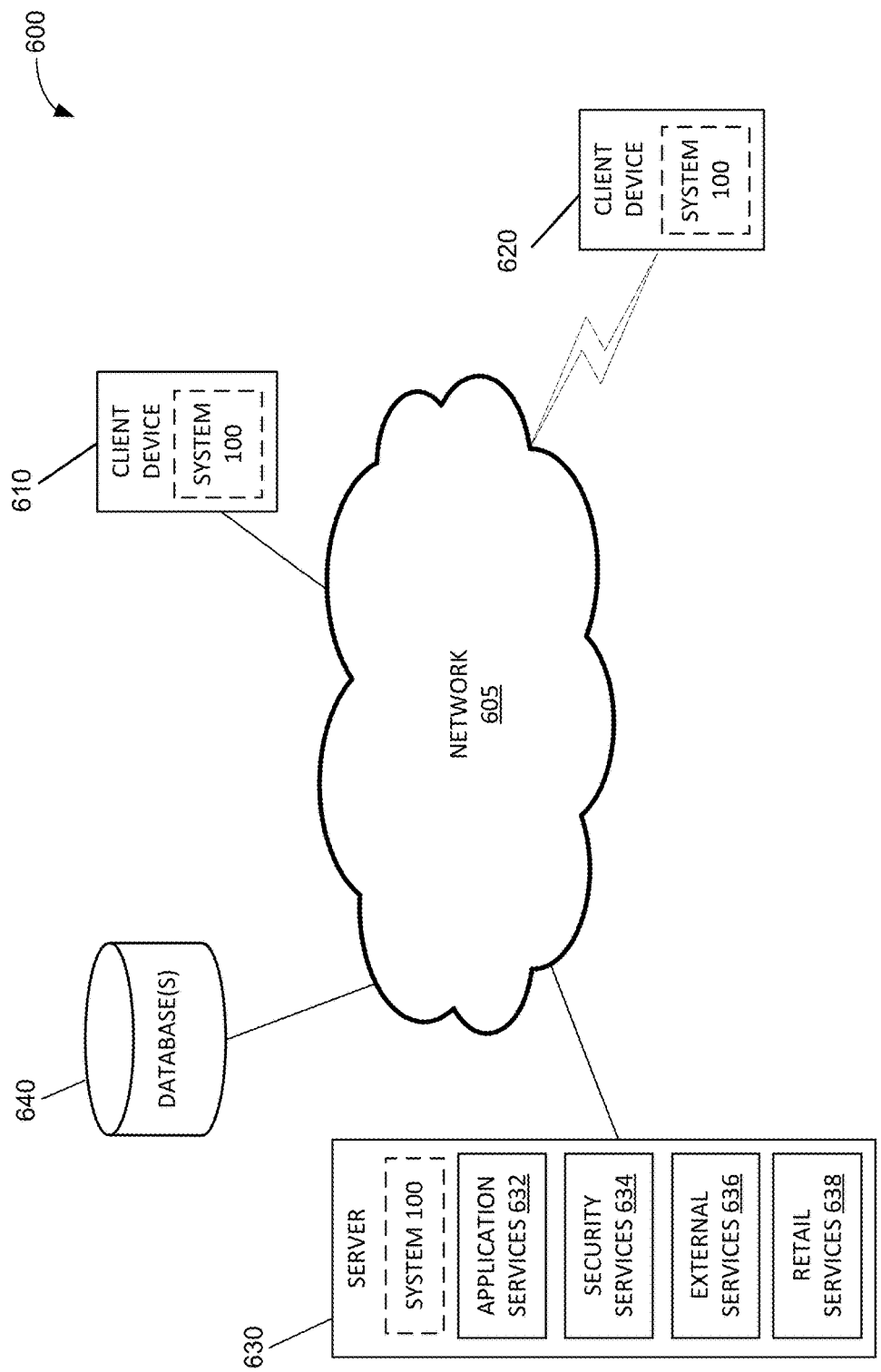
FIG. 6 is a diagram of an exemplary network environment suitable for a customer feedback classification implementation of exemplary embodiments.

FIG. 6 illustrates a network diagram depicting a system 600 for implementing the customer feedback classification system, according to an example embodiment. The system 600 can include a network 605, multiple client devices, for example, client device 610, client device 620, a server 630, and database(s) 640. Each of the client devices 610, 620, server 630, and database(s) 640 is in communication with the network 605.

In an example embodiment, one or more portions of network 605 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client devices 610, 620 may comprise, but are not limited to, mobile devices, hand-held devices, wireless devices, portable devices, wearable computers, cellular or mobile phones, portable digital assistants (PDAs), smart phones, smart watches, tablets, ultrabooks, netbooks, laptops, desktops, multi-processor systems, microprocessor-based or programmable consumer electronics, and the like. Each of client devices 610, 620 may connect to network 605 via a wired or wireless connection. In an example embodiment, the client devices 610, 620 may perform one or more of the functionalities of the customer feedback classification system 100 described herein, or transmit data or signals to the customer feedback classification system 100 described herein. For example, an individual may use the client device 610, 620 to place his or her comments about a product. The client device 610, 620 can include one or more components of computing device 700 of FIG. 7.

In an example embodiment, the customer feedback classification system 100 may be included at least in part on the client device 610, 620, and the client device 610, 620 performs one or more of the functionalities of the system described herein. In an example embodiment, the customer feedback classification system 100 may be included at least in part on the server 630, and the server 630 performs one or more of the functionalities of the dynamic delivery system 100 described herein.

The database(s) 640 comprise one or more storage devices for storing data and/or instructions (or code) for use by the server 630 and/or the client devices 610, 620. Each of the database(s) 640 and the server 630 is connected to the network 605 via a wired connection. Alternatively, one or more of the database(s) 640 and server 630 may be connected to the network 605 via a wireless connection. The server 630 comprise one or more computers or processors configured to communicate with the client devices 610, 620 via network 605. The server 630 can include one or more components of device 700 of FIG. 7. Server 630 hosts one or more software systems, applications or websites, including one or more components of the dynamic delivery system 100 described herein and/or facilitates access to the content of database(s) 640.

In an example embodiment, the server 630 also includes various software services that facilitate the functionalities of the customer feedback classification system 100. Database(s) 640 and server 630 may be located at one or more geographically distributed locations from each other or from client devices 610, 620. Alternatively, database(s) 640, 645 may be included within server 630.

Figure 7:
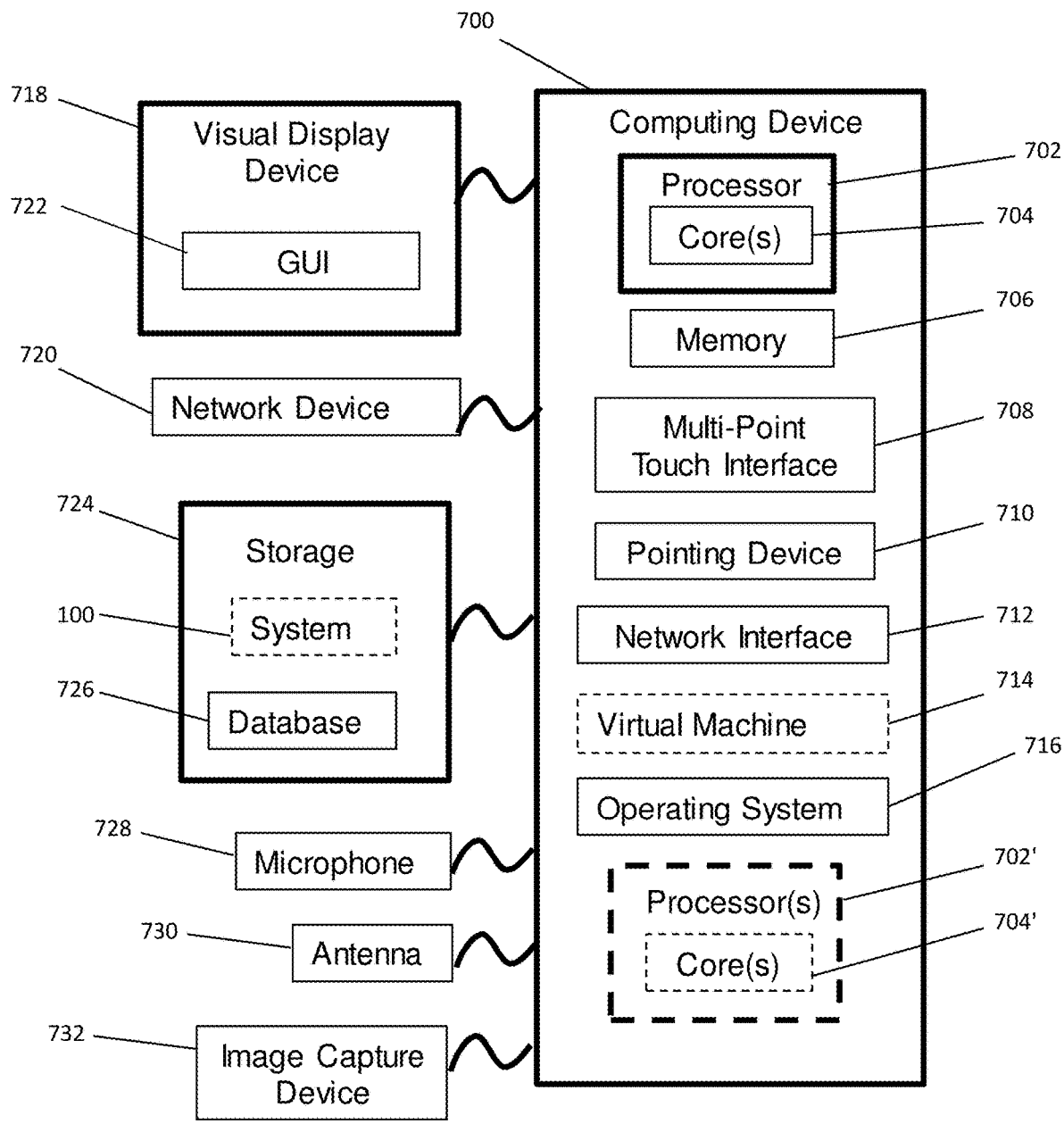
FIG. 7 is a block diagram of an exemplary computing device that may be used to implement exemplary embodiments described herein.

FIG. 7 is a block diagram of an exemplary computing device 700 that can be used to perform one or more steps of the methods provided by exemplary embodiments. For example, computing device 700 may be the client device 610, 620 and the server 630 as described in FIG. 6. The computing device 700 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 706 included in the computing device 700 can store computer-readable and computer-executable instructions or software for implementing exemplary embodiments. The computing device 700 also includes processor 702 and associated core 704, and optionally, one or more additional processor(s) 702' and associated core(s) 704' (for example, in the case of computer systems having multiple processors/cores), for executing computer-readable and computer-executable instructions or software stored in the memory 706 and other programs for controlling system hardware. Processor 7902 and processor(s) 702' can each be a single core processor or multiple core (704 and 704') processor.

Virtualization can be employed in the computing device 700 so that infrastructure and resources in the computing device can be shared dynamically. A virtual machine 714 can be provided to handle a process running on multiple processors so that the process appears to be using only one computing resource rather than multiple computing resources. Multiple virtual machines can also be used with one processor.

Memory 706 can include a computer system memory or random access memory, such as DRAM, SRAM, EDO RAM, and the like. Memory 706 can include other types of memory as well, or combinations thereof. An individual can interact with the computing device 700 through a visual display device 718, such as a touch screen display or computer monitor, which can display one or more user interfaces 719 for receiving data from the individual (e.g., order data and travel data). The visual display device 718 can also display other aspects, elements and/or information or data associated with exemplary embodiments. The computing device 700 can include other I/O devices for receiving input from a individual, for example, a keyboard or another suitable multi-point touch interface 708, a pointing device 710 (e.g., a pen, stylus, mouse, or trackpad). The keyboard 708 and the pointing device 710 can be coupled to the visual display device 718. The computing device 700 can include other suitable conventional I/O peripherals.

The computing device 700 can also include one or more storage devices 724, such as a hard-drive, CD-ROM, or other computer readable media, for storing data and computer-readable instructions and/or software, such as one or more modules of the system 100 shown in FIG. 1 that implements exemplary embodiments of the notification system as described herein, or portions thereof, which can be executed to generate user interface 719 on display 718. Exemplary storage device 724 can also store one or more databases for storing suitable information required to implement exemplary embodiments. The databases can be updated by an individual or automatically at a suitable time to add, delete or update one or more items in the databases. Exemplary storage device 724 can store one or more databases 726 for storing provisioned data, and other data/ information used to implement exemplary embodiments of the systems and methods described herein.

The computing device 700 can include a network interface 712 configured to interface via one or more network devices 722 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 712 can include a built-in network adapter, network interface card, PCMCIA network card, card bus network adapter, wireless network adapter, USB network adapter, modem or another device suitable for interfacing the computing device 700 to a type of network capable of communication and performing the operations described herein. Moreover, the computing device 900 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 700 can run an operating system 716, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 716 can be run in native mode or emulated mode. In an exemplary embodiment, the operating system 716 can be run on one or more cloud machine instances.

The description is presented to enable a person skilled in the art to create and use a computer system configuration and related method and systems for dynamic delivery scheduling. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A system for classifying customer feedback, the system comprising:
    a computing device configured to execute a capture module, a scoring module, a filtering module, a transformation module, a risk module and a categorization module,
    wherein the capture module when executed:
       captures text from at least one source relating to at least one product;
    wherein the scoring module when executed:
       scans the text and produces a score for sentiment for the at least one product;
    wherein the filtering module when executed:
       filters the text into parts of speech and key words to produce filtered text;
    wherein the transformation module when executed:
       transforms the filtered text into a term-document matrix;
    wherein the risk module when executed:
       calculates and prioritizes a risk score based on the term-document matrix, the sentiment score, and a probability that the associated product is reportable to a product safety or consumer protection agency; and
    wherein the categorization module when executed:
       reports the product and the associated risk score to a subject matter expert (SME).

2. The system of claim 1 the at least one source includes one of hotline calls and online reviews about products.

3. The system of claim 1 wherein the scoring module when executed produces a score for subjectivity for the at least one product.

4. The system of claim 1 wherein the scoring module uses a text sentiment algorithm to produce the score for sentiment for the at least one product.

5. The system of claim 1 wherein the filtering module when executed uses regular expressions and stop words to remove special characters, common words, and common phrases.

6. The system of claim 1 wherein the transformation module when executed counts each word by document and divides that amount by a total number of words in the document for determining a final score.

7. The system of claim 1 wherein the SME determines if the product is reportable or non-reportable.

8. The system of claim 4 wherein changes to a product from reportable to non-reportable or from non-reportable to reportable and fed back into the text sentiment algorithm.

9. A computer-implemented method for classifying customer feedback, the method comprising:
    capturing text from at least one source relating to at least one product;
    scanning the text and producing a score for sentiment for the at least one product;
    filtering the text into parts of speech and key words to produce filtered text;
    transforming the filtered text into a term-document matrix;
    calculating and prioritizing a risk score based on the term-document matrix,. and the sentiment score, and a probability that the associated product is reportable to a product safety or consumer protection agency; and
    reporting the product and the associated risk score to a subject matter expert (SME).

10. The method of claim 9 the at least one source includes one of hotline calls and online reviews about products.

11. The method of claim 9 further comprising producing a score for subjectivity for the at least one product.

12. The method of claim 9 wherein producing a score for sentiment for the at least one product comprises using a text sentiment algorithm.

13. The method of claim 9 wherein the filtering comprises using regular expressions and stop words to remove special characters, common words, and common phrases.

14. The method of claim 9 wherein the transforming counts each word by document and divides that amount by a total number of words in the document for determining a final score.

15. The method of claim 9 further comprising determining by the SME if the product is reportable or non-reportable.

16. The method of claim 12 wherein changing a product from reportable to non-reportable or from non-reportable to reportable includes feeding the change back into the text sentiment algorithm.

17. A non-transitory machine-readable medium storing instructions executable by a processing device, wherein execution of the instructions causes the processing device to implement a method for classifying customer feedback, the method comprising:
    capturing text from at least one source relating to at least one product;
    scanning the text and producing a score for sentiment for the at least one product;
    filtering the text into parts of speech and key words to produce filtered text;
    transforming the filtered text into a term-document matrix;
    calculating and prioritizing a risk score based on the term-document matrix, the sentiment score, and a probability that the associated product is reportable to a product safety or consumer protection agency; and
    reporting the product and the associated risk score to a subject matter expert (SME).

18. The non-transitory machine-readable medium of claim 17, wherein the method further comprises:
    determining by the SME if the product is reportable or non-reportable.

* * * * *

UNITED STATES PATENT AND TRADEMARK OFFICE
CERTIFICATE OF CORRECTION

| | | |
|---|---|---|
| PATENT NO. | : 10,963,688 B2 | Page 1 of 1 |
| APPLICATION NO. | : 16/214938 | |
| DATED | : March 30, 2021 | |
| INVENTOR(S) | : David Ferguson et al. | |

It is certified that error appears in the above-identified patent and that said Letters Patent is hereby corrected as shown below:

In the Claims

In Claim 9, at Column 10, Line 12, delete "matrix,. and" and insert --matrix,--.

Signed and Sealed this
Twenty-seventh Day of December, 2022

Katherine Kelly Vidal
*Director of the United States Patent and Trademark Office*